United States Patent
Starsinic

(10) Patent No.: US 11,829,774 B2
(45) Date of Patent: Nov. 28, 2023

(54) MACHINE-TO-MACHINE BOOTSTRAPPING

(71) Applicant: Convida Wireless, LLC, Wilmington, DE (US)

(72) Inventor: Michael F. Starsinic, Newtown, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 17/724,930

(22) Filed: Apr. 20, 2022

(65) Prior Publication Data

US 2022/0244968 A1 Aug. 4, 2022

Related U.S. Application Data

(63) Continuation of application No. 17/197,228, filed on Mar. 10, 2021, now Pat. No. 11,354,136, which is a
(Continued)

(51) Int. Cl.
*G06F 9/4401* (2018.01)
*H04W 4/70* (2018.01)
(Continued)

(52) U.S. Cl.
CPC .......... *G06F 9/4416* (2013.01); *G06F 21/445* (2013.01); *G06F 21/575* (2013.01);
(Continued)

(58) Field of Classification Search
CPC .... G06F 9/4416; G06F 21/445; G06F 21/575; G06F 2221/034; H04W 4/70; H04W 12/0431; H04W 12/04
See application file for complete search history.

(56) References Cited

U.S. PATENT DOCUMENTS 6,446,116 B1 9/2002 Burridge
7,814,058 B2 10/2010 Beck
(Continued)

FOREIGN PATENT DOCUMENTS

CN 101730100 A 6/2010
CN 102355743 A 2/2012
(Continued)

OTHER PUBLICATIONS

"Secure bootstrapping of nodes in a CoAp network": 122 IEEE/ (bootstrap and m2m) and 2014 advanced search of full text.
(Continued)

*Primary Examiner* — Azizul Choudhury
(74) *Attorney, Agent, or Firm* — BakerHostetler

(57) ABSTRACT

Methods, devices, and systems allow for bootstrapping of a machine-to-machine device. In an embodiment, a bootstrap erase architecture allows the machine-to-machine server to manage bootstrap erase policies, detect access network specific events, initiate a bootstrap erase based on these policies and events, and allow for machine-to-machine server handover. In another embodiment, a device or gateway service capability layer may request its network service capability layer fetch data that the device or gateway, previously stored on a different network service capability layer. In another embodiment, when bootstrap erase is performed because the network service capability layer can no longer provide service to the device or gateway, the network service capability layer may recommend other NSCLs to the device or gateway. In another embodiment, a bootstrap erase procedure may be modified so that temporary identifiers may be assigned for a next bootstrapping event.

20 Claims, 9 Drawing Sheets

Related U.S. Application Data continuation of application No. 14/888,977, filed as application No. PCT/US2014/036929 on May 6, 2014, now Pat. No. 10,977,052.

(60) Provisional application No. 61/819,951, filed on May 6, 2013.

(51) Int. Cl.
*G06F 21/44* (2013.01)
*G06F 21/57* (2013.01)
*H04W 12/0431* (2021.01)
*H04W 12/04* (2021.01)

(52) U.S. Cl.
CPC ............ *H04W 4/70* (2018.02); *H04W 12/04* (2013.01); *H04W 12/0431* (2021.01); *G06F 2221/034* (2013.01)

(56) References Cited

U.S. PATENT DOCUMENTS

| | | | |
|---|---|---|---|
| 7,992,198 | B2 | 8/2011 | Guarraci et al. |
| 8,578,153 | B2 | 11/2013 | Eld et al. |
| 8,843,753 | B2 | 9/2014 | Yegin et al. |
| 8,875,236 | B2 | 10/2014 | Holtmanns et al. |
| 2003/0103484 | A1 | 6/2003 | Oommen et al. |
| 2004/0193880 | A1 | 9/2004 | Walmsley |
| 2004/0249904 | A1 | 12/2004 | Moore et al. |
| 2007/0124503 | A1 | 5/2007 | Ramos et al. |
| 2008/0256616 | A1 | 10/2008 | Guarraci et al. |
| 2009/0077248 | A1 | 3/2009 | Castellucci et al. |
| 2009/0258631 | A1* | 10/2009 | Forsberg ............. H04L 63/08 455/411 |
| 2009/0259849 | A1 | 10/2009 | Faynberg et al. |
| 2009/0265737 | A1 | 10/2009 | Issa et al. |
| 2010/0106967 | A1 | 4/2010 | Johansson et al. |
| 2010/0182960 | A1 | 7/2010 | Valko et al. |
| 2010/0186967 | A1 | 7/2010 | Xu et al. |
| 2011/0243553 | A1* | 10/2011 | Russell ............... H04M 7/0063 398/115 |
| 2012/0151223 | A1 | 6/2012 | Conde Marques et al. |
| 2012/0159140 | A1 | 6/2012 | Chang et al. |
| 2012/0265979 | A1 | 10/2012 | Yegin et al. |
| 2012/0303912 | A1 | 11/2012 | Calder et al. |
| 2013/0117564 | A1 | 5/2013 | Chang et al. |
| 2013/0188515 | A1 | 7/2013 | Pinheiro et al. |
| 2013/0203394 | A1* | 8/2013 | Dong .................... H04W 4/00 455/414.1 |

FOREIGN PATENT DOCUMENTS

| | | |
|---|---|---|
| CN | 102769882 A | 11/2012 |
| CN | 103703698 A | 4/2014 |
| JP | 2007-041677 A | 2/2007 |
| JP | 2010-500783 A | 1/2010 |
| JP | 2011-524652 | 9/2011 |
| KR | 10-2013-0004497 A | 1/2013 |
| WO | 2008/018150 A8 | 7/2008 |
| WO | 2011/112683 A1 | 9/2011 |
| WO | 2012/058166 A2 | 5/2012 |
| WO | 2012/061678 A1 | 5/2012 |
| WO | 2012/135680 A1 | 10/2012 |
| WO | 2012/141556 A2 | 10/2012 |

OTHER PUBLICATIONS

3rd Generation Partnership Project; (3GPP), TR 21.905 V11.3.0, 3rd Generation Partnership Project; Technical Specification Group Services and System Aspects; Vocabulary for 3GPP Specifications (Release 11), Dec. 2012, 64 pages.
3rd Generation Partnership Project; (3GPP), TS 22.011 V12.0.0, 3rd Generation Partnership Project; Technical Specification Group Services and System Aspects; Service accessibility (Release 12), Mar. 2013, 26 pages.
3rd Generation Partnership Project; (3GPP), TS 22.368 V12.2.0, 3rd Generation Partnership Project; Technical Specification Group Services and System Aspects; Service requirements for Machine-Type Communications (MTC); Stage 1 (Release 12), Mar. 2013, 24 pages.
3rd Generation Partnership Project; (3GPP), TS 23.008 V11.9.0, 3rd Generation Partnership Project; Technical Specification Group Core Network and Terminals; Organization Of Subscriber Data (Release 11), Dec. 2013, 110 pages.
3rd Generation Partnership Project; (3GPP), TS 23.682 V11.3.0, 3rd Generation Partnership Project; Technical Specification Group Services and System Aspects; Architecture enhancements to facilitate communications with packet data networks and applications (Release 11), Dec. 2012, 29 pages.
ETS1102 690 V2.0.13 Technical Specification, "Machine-to-Machine Communications (M2M); Functional Architecture", May 2013, 328 pages.
ETSI TS 102 690 v1.1.1 Machine-to-Machine Communications (M2M); Functional Architecture, Oct. 2011, 130 pages.
ETSI TS 102 921 v1.1.1, Machine-to-Machine Communications (M2M); mla, dla and mid Interfaces, Feb. 2012, 538 pages.
Farha, "Peer-to-Peer Mobility Management for all-IP Networks", Communications, 2006, IEEE International Conference on Istanbul, vol. 5, Jun. 2006, 1-7, Abstract.

* cited by examiner

MACHINE-TO-MACHINE BOOTSTRAPPING

CROSS-REFERENCE TO RELATED APPLICATIONS

This application is a continuation of U.S. patent application Ser. No. 17/197,228 filed Mar. 10, 2021 which is a continuation of U.S. patent application Ser. No. 14/888,977 filed Nov. 4, 2015 now U.S. Pat. No. 10,977,052 issued Apr. 13, 2021 which is the National Stage Application filed under 35 U.S.C. 371 of International Application No. PCT/US2014/036929, filed May 6, 2014, which claims the benefit of U.S. Provisional Patent Application No. 61/819,951, filed on May 6, 2013, entitled "M2M BOOTSTRAP ERASE PROCEDURES," the contents of which are hereby incorporated by reference herein.

BACKGROUND

Bootstrapping is a process by which entities (e.g., an end-user device and server) perform mutual authentication and key agreement to establish a relationship enabling secure communications between them. Mutual authentication is a procedure in which each party proves its identity to the other. For example, if the Generic Bootstrapping Architecture (GBA) is used, authentication may be achieved by making a network component challenge the subscriber identity module (SIM) card of the end-user device and verify that the answer is identical to the one predicted by a home location register (HLR) or home subscriber server (HSS). Authentication helps prevent a rogue device from registering with a server by pretending it is a legitimate end-user device. Authentication also helps prevent a fraudulent server from performing a man-in-the-middle attack, which may consist of the fraudulent server establishing a connection with an end-user device by pretending that is a legitimate server.

Key agreement is a procedure in which the communicating entities derive a security key that they can then use to secure communications between them, for example, by an encryption process that uses the security key. A feature of a key agreement mechanism is that the key is not transmitted. The key derivation function may be based on a shared secret value that is meant for only an end-user device and server to know, for example. This shared secret is also not transmitted. The key derivation function is designed such that it is prohibitively computationally complex for an eavesdropper, who does not know the shared secret, to compute the key by observing the messages that are transmitted during the key agreement procedure. An overview of some authentication and key agreement mechanisms is discussed herein.

Extensible Authentication Protocol (EAP) is not an authentication method in itself, but rather a common authentication framework that can be used to implement specific authentication methods. In other words, EAP is a protocol that allows the Peer, Authenticator, and Authentication Server to negotiate what authentication method will be used. The selected authentication method is then run inside of the EAP protocol. EAP is defined in RFC 3748. RFC 3748 describes the EAP packet format, procedures, as well as basic functions such as negotiation of the desired authentication mechanism.

EAP was designed as a link layer (Layer 2) protocol. Protocol for Carrying Authentication for Network Access (PANA) is a protocol that can be used to carry EAP messages over an IP network. In other words, PANA is a transport for EAP. PANA runs on top of the network (IP) layer. PANA is defined in RFC5191. PANA allows dynamic service provider selection, supports various authentication methods, is suitable for roaming users, and is independent from the link layer mechanisms.

The SCL is a functional entity that may be implemented by hardware and/or software and that provides functions exposed on reference points (i.e., functional interfaces between M2M entities). For example, the SCL may provide common (service) functionalities that are shared or commonly used by different M2M applications and/or services. These common functionalities may be exposed using a set of open interfaces. For example, SCL may provide cellular core network functionalities through a set of exposed interfaces (e.g., existing interfaces specified by 3GPP, 3GPP2, ETSI TISPAN, etc.) and may also interface to one or more other core networks.

Bootstrap erase is a process in which entities break their relationship. Security keys are invalidated during bootstrap erase. If the entities attempt to communicate again after bootstrap erase, then the bootstrapping procedure is restarted. A machine-to-machine (M2M) server, a gateway, or device may initiate bootstrap erase. European Telecommunications Standards Institute (ETSI) M2M mid specification, ETSI TS 102 921, defines a bootstrap erase procedure. It is based on the protocol for carrying authentication for network access (PANA) termination procedure, which is defined in RFC 5191. The procedure consists of two messages passed between a device/gateway SCL (D/GSCL) and an M2M Server or NSCL. The first message requests a bootstrap erase and the second message is a reply. Either the D/GSCL or the M2M server may initiate the bootstrap erase process.

Bootstrapping is a process that often requires secret keys or certificates provisioned in a device in order to achieve a desired level of security. In a machine-to-machine environment, a large number of devices bootstrap with a M2M server.

SUMMARY

Disclosed herein are methods, devices, and systems related to bootstrapping. In an embodiment, a bootstrap erase architecture is defined that allows a machine-to-machine (M2M) server to manage bootstrap erase policies, detect access network specific events, initiate a bootstrap erase based on these policies and events, and allow for M2M server handover.

In an embodiment, a network service capability layer (NSCL) handover procedure is defined where a device or gateway service capability layer may request its NSCL fetch data that the device or gateway previously stored on a different NSCL. This procedure may allow the device or gateway to avoid recreating information on the new NSCL.

In an embodiment, when bootstrap erase is performed because the NSCL can no longer provide service to the device or gateway, the NSCL may recommend other NSCLs to the device or gateway. The recommended NSCL may be better suited to serve the device or gateway.

Temporary identifiers may be used to hide the true identity of the device and device/gateway SCL (D/GSCL) when it attempts to re-bootstrap. In an embodiment, the bootstrap erase procedure is modified so that temporary identifiers may be assigned for the next bootstrapping event.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Embodiments set forth herein may be described in terms of a representational state transfer (REST) architecture, with components and entities described conforming to the constraints of a REST architecture (RESTful architecture). A RESTful architecture is described in terms of the constraints applied to components, entities, connectors, and data elements used in the architecture rather than in terms of physical component implementation or communications protocols used. Thus, the roles and functions of the components, entities, connectors, and data elements will be described. In a RESTful architecture, representations of uniquely addressable resources are transferred between entities. The ETSI M2M specification (e.g., TS 102 921 and TS 102 690 as discussed herein) has standardized the resource structure that resides on an SCL. When handling resources in a RESTful architecture, there are basic methods that may be applied to resources, such as Create (create child resources), Retrieve (read the content of the resource), Update (write the content of the resource) or Delete (delete the resource.) One skilled in the art will recognize that implementations of the instant embodiments may vary while remaining within the scope of the present disclosure. One skilled in the art will also recognize that the disclosed embodiments are not limited to implementations using the ETSI M2M architecture that is used herein to describe exemplary embodiments. The disclosed embodiments may be implemented in architectures and systems, such as one M2M and other M2M systems and architectures.

Bootstrapping is a process that often requires secret keys or certificates to be provisioned in a device in order to achieve a desired level of security. In a machine-to-machine environment, a large number of devices bootstrap with a machine-to-machine (M2M) Server. Addressed herein are bootstrapping related issues regarding sending device identities "in the clear," bootstrap erase events and policies, and service capability layer handover, among other things.

Service capability layer (SCL) handover includes a process in which a device or gateway that is registered to one NSCL may move its registration to a second NSCL and then initiate a procedure where the device or gateway's resources are transferred from the first NSCL to the second NSCL. Similarly, service capability layer (SCL) handover includes a process in which a device that is registered to one GSCL may move its registration to a second GSCL and then initiate a procedure where the device's resources are transferred from the first GSCL to the second GSCL.

Figure 1:
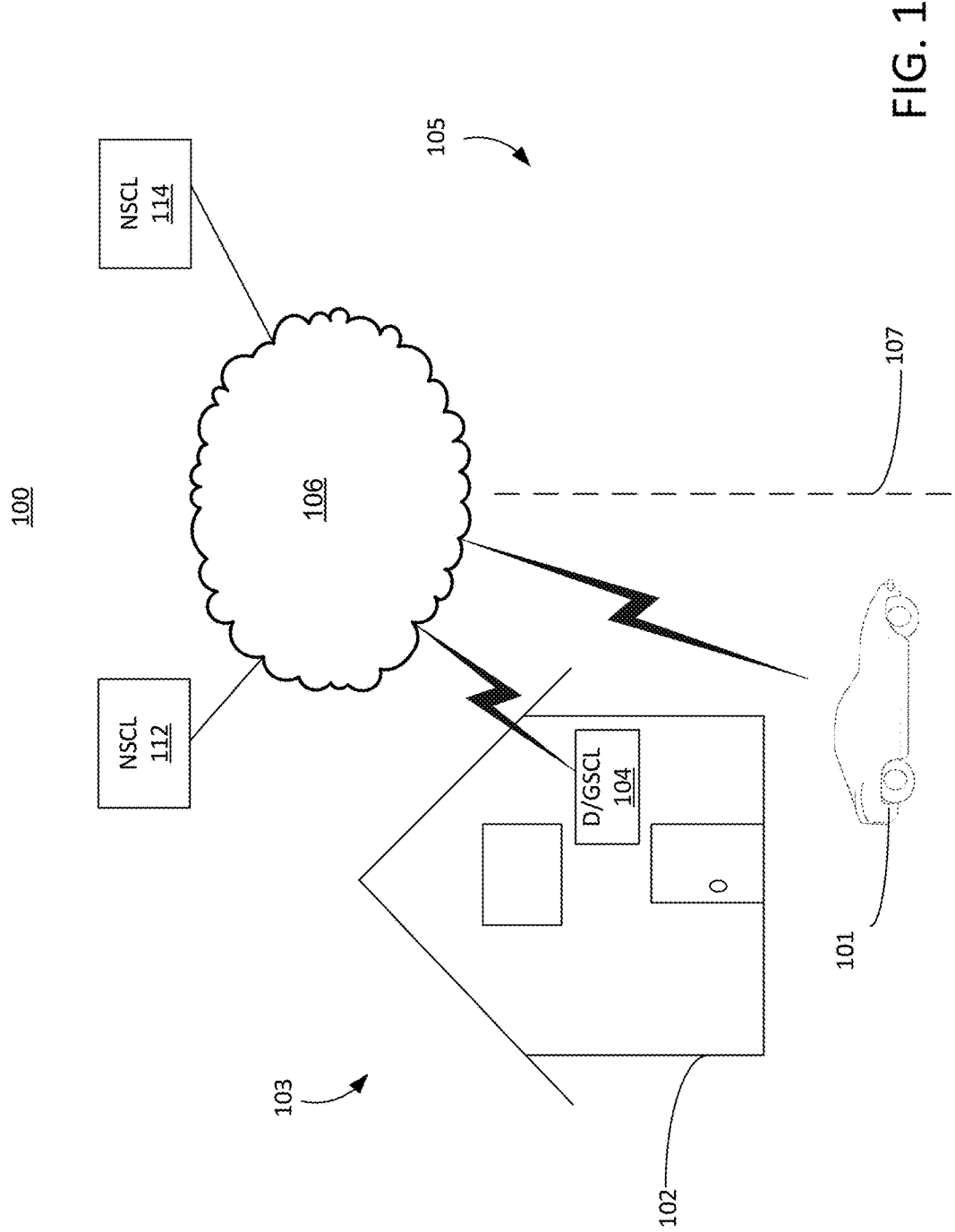
FIG. 1 illustrates an exemplary environment that service capability layer handover may occur.

FIG. 1 illustrates an exemplary environment 100 in which SCL handover may occur. NSCL 112 and NSCL 114 are connected with network 106. D/GSCL 104, which is located within house 102, is communicatively connected with network 106 and other devices (not shown) in house 102. Car 101, which includes a machine-to-machine device, is communicatively connected with network 106. Environment 100 is divided into two areas separated by line 107—area 103 and area 105.

In an embodiment, referencing environment 100, NSCL 112 may provide service A and service B. NSCL 114 may provide service A, service B, and service C. D/GSCL 104 may initially be connected with NSCL 112 with regard to service A or service B. However, at some point in time, D/GSCL 104 may need service C which is not provided by NSCL 112. When this occurs, D/GSCL 104 may be handed over to (registered with) NSCL 114 in order to have service C provided. NSCL 114 may continue to provide service C as well as service A and service B to D/GSCL 104 or be handed back to NSCL 112. Handover of D/GSCL 104 back to NSCL 112 may be based on a variety of possibly weighted factors, such as frequency of use of services A, B, or C, latency, bandwidth, or the like.

In an embodiment, after D/GSCL 104 executes a bootstrap erase procedure with NSCL 112, so that it may register with NSCL 114. Rather than recreating resources on NSCL 114, D/GSCL 104 may request that data, or resources, from NSCL 112 be transferred to NSCL 114. During the bootstrap erase process, D/GSCL 104 may be provided with a handover token that NSCL 114 can use with NSCL 112 to retrieve the D/GSCL 104 related data from NSCL 112. A handover token may be a value, such as a number, letter, or combination of numbers and letters, that, when presented, confirms authorization to access services or access information. Here, NSCL 114 may provide NSCL 112 a handover token that indicates NSCL 114 is authorized to retrieve D/GSCL 104 related data from NSCL 112. NSCL 112 may provide the handover token to D/GSCL 104. The handover token may be specific authorization for just D/GSCL 104 related information or may be a more general authorization to access other information (e.g., other D/GSCLs) on NSCL 112.

In another embodiment, referencing environment 100, car 101 may be communicatively connected with NSCL 112. Bootstrap erase may be used by the NSCL 112 to end its relationship with car 101 and recommend another NSCL, such as NSCL 114, that may provide services to D/GSCL 104. A factor that may be considered in this process is that area 103 may be generally allocated to NSCL 112 and area 105 may be allocated to NSCL 114. When car 101 moves into area 105, the geographic area and other factors regarding the suitability of NSCL 112 to serve car 101, may be considered before handing over from NSCL 112 to NSCL 114.

Figure 2A:
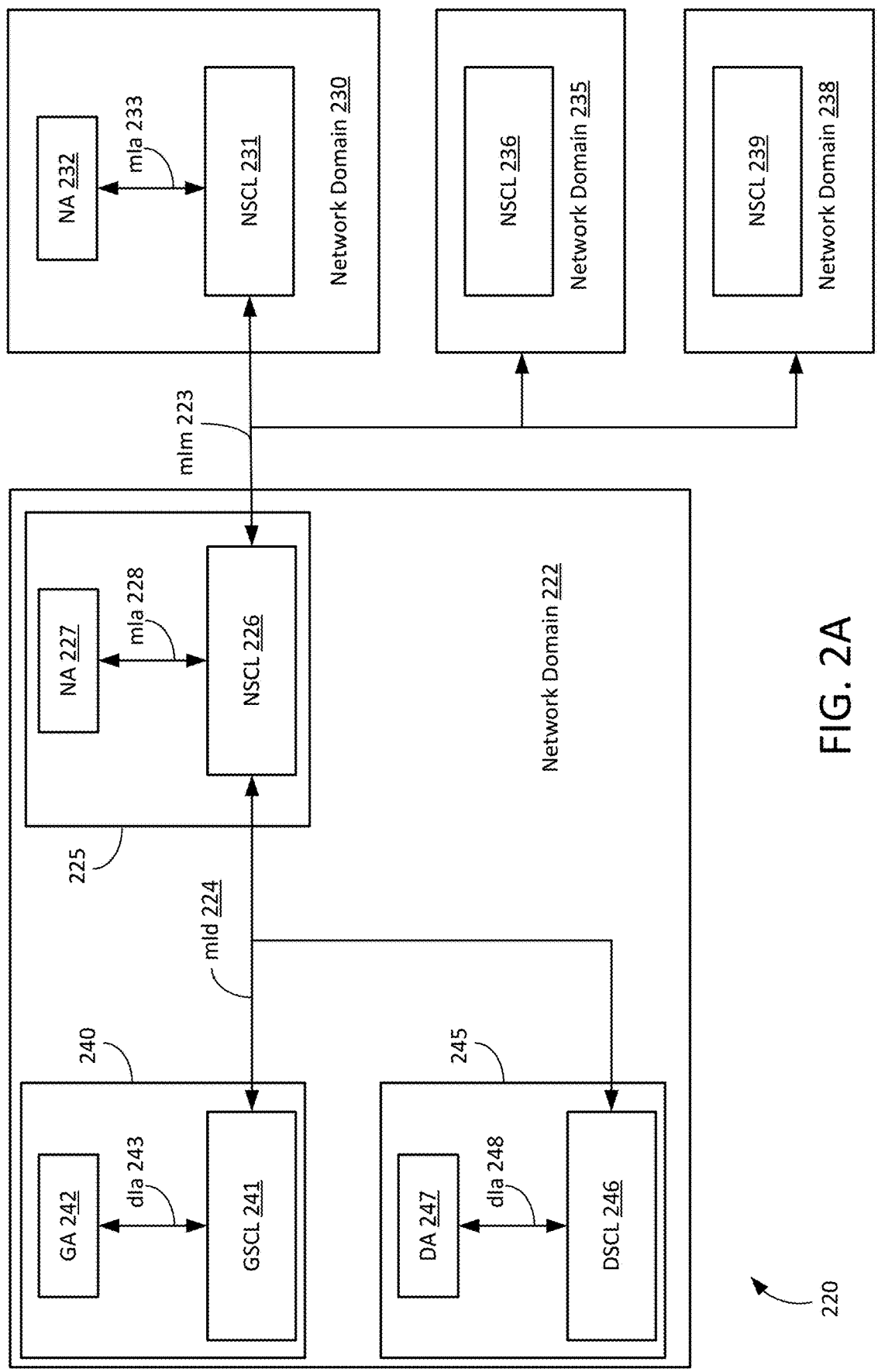
FIG. 2A illustrates an exemplary M2M system including devices and reference points.

FIG. 2A illustrates an exemplary ETSI M2M system 220 that may be used in some disclosed embodiments for machine-to-machine bootstrapping. Note that this example system is simplified to facilitate description of the disclosed subject matter and is not intended to limit the scope of this disclosure. Other devices, systems, and configurations may be used to implement the embodiments disclosed herein, in addition to, or instead of, a system such as system 220, and all such embodiments are contemplated as within the scope of the present disclosure.

NSCL 226 may be in domain 222 and configured with network application (NA) 227 at M2M server platform 225. NA 227 and NSCL 226 may communicate via reference point mIa 228. The mIa reference point may allow an NA to access the M2M service capabilities available from an NSCL in an M2M domain. In addition, within network domain 222 may be GSCL 241 and gateway application (GA) 242 that may be configured at M2M gateway device 240. GSCL 241 and GA 242 may communicate using reference point dIa 243. Further, within network domain 222 may be DSCL 246 and device application (DA) 247 that may be configured at M2M device 245. DSCL 246 and DA 247 may communicate using reference point dIa 248. Each of GSCL 241 and DSCL 246 may communicate with NSCL 226 using reference point mid 224. In general, dIa reference points allow device and gateway applications to communicate with their respective local service capabilities (i.e., service capabilities available at a DSCL and a GSCL, respectively). The mid reference point allows an M2M SCL residing in an M2M Device (e.g., DSCL 246) or an M2M Gateway (e.g., GSCL 241) to communicate with the M2M service capabilities in the network domain and vice versa (e.g., NSCL 226).

NSCL 231 may be in domain 230 with NA 232. NA 232 and NSCL 231 may communicate via mIa reference point 233. There may be an NSCL 236 in network domain 235, and NSCL 239 in network domain 238. mIm reference point 223 may be an inter-domain reference point that allows M2M network nodes in different network domains, such as NSCL 226 in network domain 222, NSCL 231 in network domain 230, NSCL 236 in network domain 235, or NSCL 239 in network domain 238, to communicate with one another. For simplicity herein, the term "M2M server" may be used to indicate a service capability server (SCS), NSCL, application server, NA, or an MTC server. In addition, the term user equipment (UE), as discussed herein, may apply to a GA, GSCL, DA, or DSCL. A UE, as discussed herein, may be considered a mobile station, a fixed or mobile subscriber unit, a pager, a cellular telephone, a personal digital assistant (PDA), a smartphone, a laptop, a netbook, a personal computer, a wireless sensor, consumer electronics, medical devices, automobiles, and the like. M2M server or a UE may more generally be described as a machine-to-machine network services capabilities layer entity.

Figure 2B:
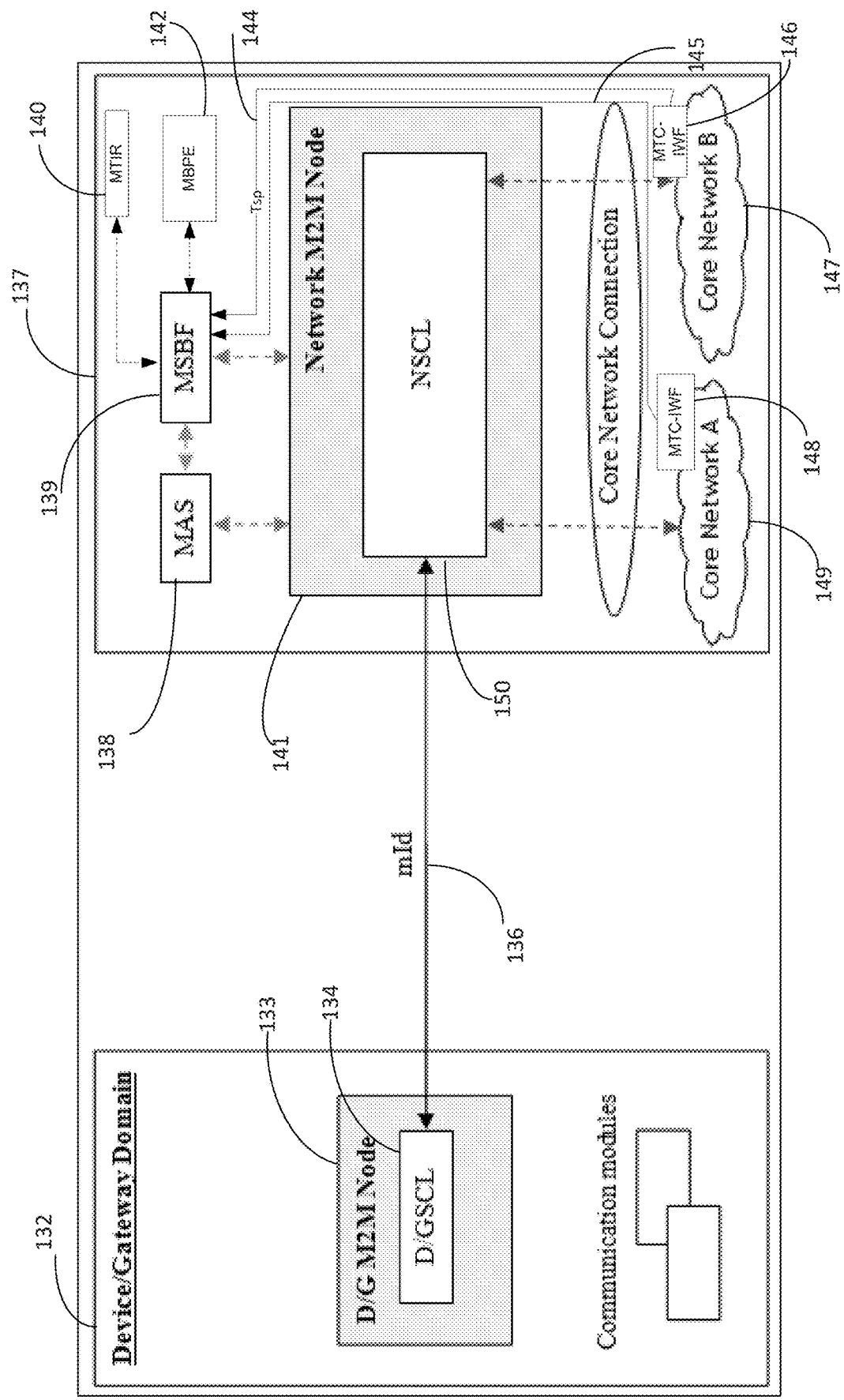
FIG. 2B illustrates architecture elements for bootstrapping.

FIG. 2B illustrates functional architecture elements for bootstrapping in a machine-to-machine environment. In device or gateway domain 132 there is a D/GSCL 134. D/GSCL 134 is communicatively connected to NSCL 150 via interface link 136. Link 136 may be an mId interface as discussed in European Telecommunications Standards Institute (ETSI) M2M mId specification, ETSI TS 102 921. NSCL 150 may be communicatively connected with the devices, networks, and interfaces in block 137, such as M2M authentication server (MAS) 138, M2M bootstrap service function (MSBF) 139, and core network 149.

M2M Bootstrap Policy Engine (MBPE) 142, machine type communication inter-working function (MTC-IWF) 146, MTC-IWF 148, Tsp interface 144, and M2M Temporary Identifier Repository (MTIR) 140 may facilitate the bootstrapping process, such as initiating the bootstrap erase process. Tsp interface 144 may be the control plane as defined by 3GPP. Generally, an interface between an MTC-IWF and an M2M is called a Tsp. The MBPE 142 may be used to store, in a memory of the MBPE, policies that indicate when a bootstrap erase should be initiated with each device. For example, MBPE 142 might hold a policy that indicates that a bootstrap erase should be performed on a particular device if it is moved into a new tracking area or geographic area. A processing function of the MBPE may be configured to retrieve the policy from memory and cause the MBPE to act in accordance with the policy.

In greater detail, MBPE 142 is a logical entity that holds policies regarding what events or conditions should cause particular devices, or groups of devices, to be bootstrap-erased. When certain conditions, or events, are detected, the MBPE policies may dictate that D/GSCL 134 execute a bootstrap erase. For example, policies may indicate that a bootstrap erase should be executed when a D/GSCL deregisters from the NSCL or because of a possible security threat, such as unexpected mobility or change of international mobile subscriber identity (IMSI) and international mobile station equipment identity (IMEI) association.

Other conditions, or events, may indicate that NSCL 150 should no longer provide service to D/GSCL 134. However, NSCL 150 may want to "handoff" D/GSCL 134 to another NSCL that may provide the desired services. For example, the current NSCL 150 might not be capable of serving devices in a given geographic area or may not have a relationship with the access network that is currently serving D/GSCL 134. It may be desirable to handover D/GSCL 134 to another NSCL that may provide the desired services.

Table 1 lists exemplary types of network specific events that may cause NSCL 150 to initiate a bootstrap erase. In a 3GPP network, these event notifications are passed to MTC-IWF 146 (or MTC-IWF 148) by the detecting node. For example, here, MTC-IWF 146 may notify NSCL 150 of an event. In another example, a network node in the 3GPP core network A 149 or core network B 147, such as a 3GPP Mobility Management Entity (MME), Serving General Packet Radio Service (GPRS) Support Node (SGSN), or Mobile Switching Center (MSC) (not shown) may notify NSCL 150 when a routing area update, tracking area update, location area update, a routing area update rejection, tracking area update rejection, location area update rejection, or a change in serving node occurs for node 133 that hosts D/GSCL 134. Node 133 may be a 3GPP UE. The SGSN, MME, or MSC may not have a direct connection to NSCL 150. Notifications from the SGSN, MME, and MSC may be sent to NSCL 150 via MTC-IWF 146 and Tsp interface 144. In another example, in a 3GPP network an eNodeB (not shown) may inform NSCL 150 when node 133 that hosts D/GSCL 134 is experiencing poor radio channel conditions. Notifications from the eNodeB may be sent to NSCL 150 via MTC-IWF 146 and Tsp interface 144. In another example, in a 3GPP network a Home Subscriber Server (HSS) (not shown) might inform NSCL 150 when node 133 that hosts D/GSCL 134 is experiencing a change in IMSI/IMEI association. Notifications from the HSS may be sent to NSCL 150 via the MTC-IWF 146 and Tsp interface 144 or they may be passed directly to NSCL 150 via other core network interfaces that are not shown in FIG. 2B such as a Mh interface.

TABLE 1

Access Network Events for Bootstrap-Erase

| Event | Detecting Node | Description |
| --- | --- | --- |
| Tracking/Routing/Location Area Change | mobility management entity (MME)/serving general packet radio service (GPRS) support node (SGSN)/mobile switching center (MSC) | The device may have roamed into an area where service should not be provided or where the device should be handed off to another NSCL. The following are example interfaces that the event notification may be passed over: T5a/b/c, Tsp |
| Tracking/Routing/Location Area Change Rejected | MME/SGSN/MSC | Routing area updates may be rejected if the device moves into a regional subscription zone identity (RSZI) that is not allowed. When this happens, it could be an indication of device theft. The following are example interfaces that the event notification may be passed over: T5a/b/c, Tsp |
| Change of Serving Node | MME/SGSN/MSC | The new serving node may be owned by an operator that has no business agreement with the service provider. The new serving node might not support a T5 interface. The following are example interfaces that the event notification may be passed over: T5a/b/c, Tsp |
| Poor Channel Conditions | Evolved node B (eNodeB) | Poor channel conditions could be used as an indication that it would be more efficient for the device to bootstrap erase and attempt to reconnect at a later time. The following are example interfaces that the event notification may be passed over: S1-MME, T5a/b/c, Tsp |
| Change of IMSI/IMEI Association | HSS | Change of IMSI/IMEI association could be an indication of compromised security. The following are example interfaces that the event notification may be passed over: S6m, Tsp, Mh |

Machine type communication inter-working function (MTC-IWF) 146 and MTC-IWF 148 are network nodes that allow M2M servers (e.g., NSCL 150) to interface to core network 147 and core network 149. MTC-IWF 146 and MTC-IWF 148 may hide the underlying topology of the core network from NSCL 150. Here MTC-IWF 146 and MTC-IWF 148 are connected with NSCL 150 via Tsp interface 144 and Tsp interface 145, respectively. Tsp interface 144 and Tsp interface 145 may support trigger requests, among other things, from NSCL 150 to the core network.

NSCL 150 receives event information from the network, which may arrive via Tsp 144 or Tsp 145. Based on the event information received, MSBF 139 may make decisions on when devices should execute the bootstrap erase procedure. Decisions may be based on the policies stored and processed in MBPE 142 and event information from an access network. The M2M Temporary Identifier Repository (MTIR) 140 in FIG. 2B may be a logical entity that holds a database, or list, of temporary identifiers that have been assigned to D/GSCLs (or other devices). MTIR 140 retains the mapping between the temporary identifiers and the permanent identifiers. For example, a D/GSCL may have a temporary identifier of qrxp3121994@lmnop.mfs. MTIR 140 may internally keep a mapping that indicates that qrxp3121994@lmnop.mfs=mikes-mobilehandset@mobile-network.com. MTIR 140 may also retain the associated handover tokens, which is discussed in more detail herein. A processing function of MTIR 140 may be configured to retrieve the temporary identifiers or handover tokens from memory and cause the MTIR 140 to provide it to a computing device to make appropriate decision or provide it to a display for viewing. The term "temporary identifier" may relate to an identifier that is used for a predetermined procedure or set of procedures (e.g., initial bootstrapping setup/registration), or for a predetermined time duration. After the procedure, set of procedures, or time duration, the temporary identifier may be exchanged for a new temporary identifier or a permanent identifier.

M2M device security includes challenges beyond the security challenges that are inherent in most handheld devices. Unlike most handheld devices, M2M devices are often deployed in areas where they are not always visible to the owner. In other words, the physical security of an M2M device is more likely to be compromised than that of a handheld device. When events, such as mobility or a change of access network, are detected by the NSCL, policies may require that a bootstrap erase procedure be executed with the D/GSCL. Events such as mobility, change of access network, power cycle, loss of network coverage, and certain types of device tampering are sometimes detected by the access network, but not detected by the service layer. The access network's capabilities may be leveraged to initiate bootstrap erase procedures. After executing a bootstrap erase procedure, the D/GSCL may re-execute the bootstrap process so that it can reauthenticate with the NSCL (or authenticate with a new NSCL) and derive new security keys.

Figure 3:
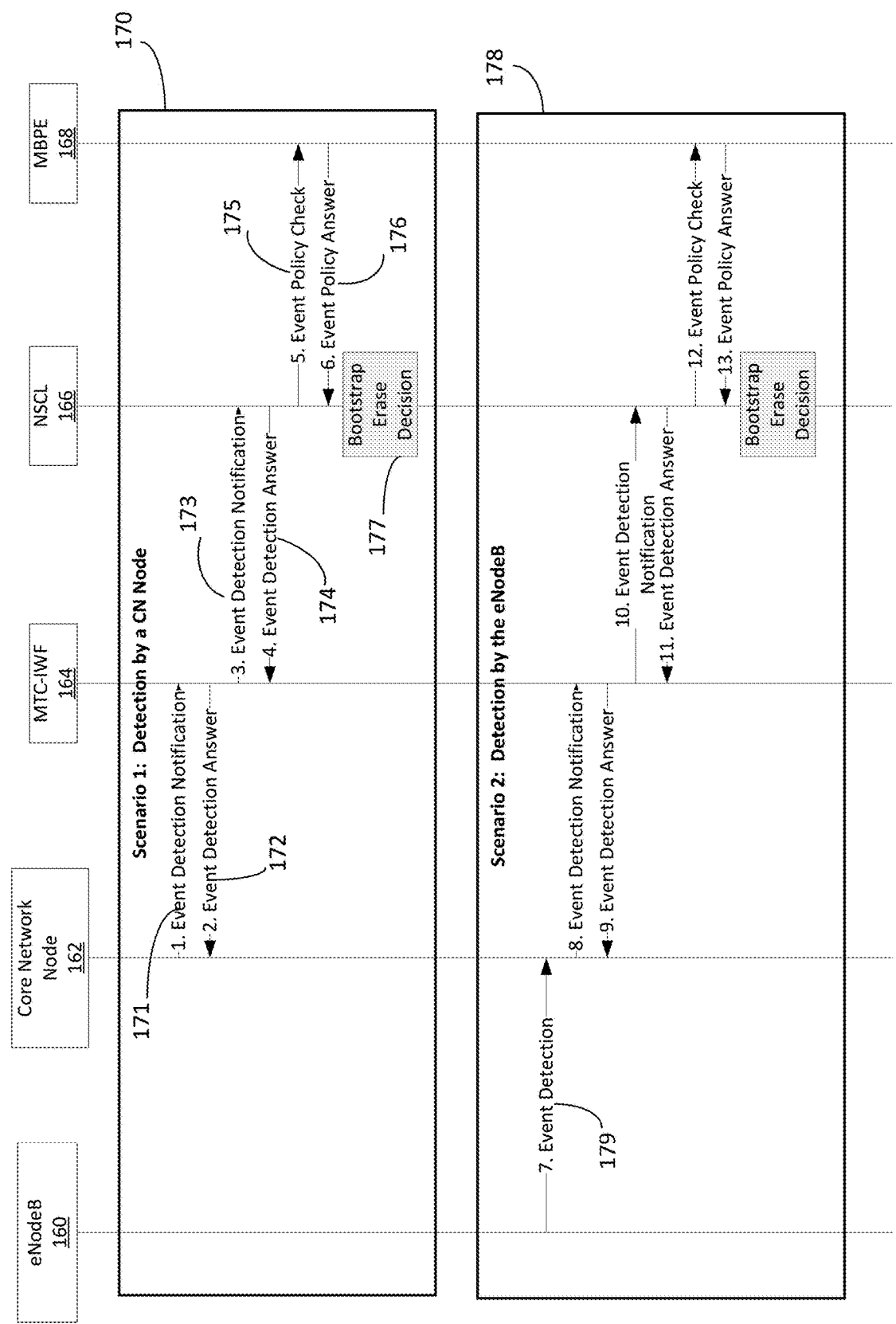
FIG. 3 illustrates event detection for bootstrap erase.

FIG. 3 illustrates exemplary flows of detected events that are passed to NSCL 166 to initiate bootstrap erase, which may occur during NSCL handover or another event appropriate for executing bootstrap erase. In a first scenario as shown in block 170, an event is detected by core network (CN) node 162. Examples of core network nodes include network nodes like the nodes listed in Table 1, such as an MME, a HSS, or the like. At 171, core network node 162 sends an event detection notification message to MTC-IWF 164. The event detection notification message includes information notifying the NSCL 166 of an event, such as one of those listed in Table 1. At 172, MTC-IWF sends an event detection answer message to core network node 162. At 173, MTC-IWF forwards the event detection notification to NSCL 166. At 174, NSCL 166 forwards an event detection answer message to MTC-IWF 164. At 172 and at 174 the messages are acknowledgments that may use the diameter protocol. <At 175, NSCL 166 sends an event policy check to MBPE 168. The event policy check asks whether there are any policies governing these events, and the event policy answer provides the policy. At 176, MBPE sends an event policy answer message to NSCL 166. The event policy answer may indicate to NSCL 166 what action should be taken when the event occurs, based on the stored policy with regard to bootstrapping maintained by the MBPE. For example, one such stored bootstrap policy may involve bootstrap erase during a change of IMSI/IMEI association. The event policy answer may indicate that MBPE 168 policy is to ask the D/GSCL to bootstrap erase when a change of IMSI/IMEI association occurs. At block 177, a bootstrap erase decision is made based on the received information regarding the event, which may include information returned in the event policy answer. The policy helps determine the bootstrap erase decision. For example, if the policy states that it is okay for the D/GSCL to be mobile, when the network indicates a mobility event, NSCL 166 will not execute a bootstrap erase.

FIG. 3 illustrates a second scenario shown in block 178. In this instance, the event is detected by an eNode B 160. At 179, eNode B 160 sends an event notification message to core network node 162. Core network node 162 begins the process with MTC-IWF 164 as similarly illustrated in block 170.

Figure 4:
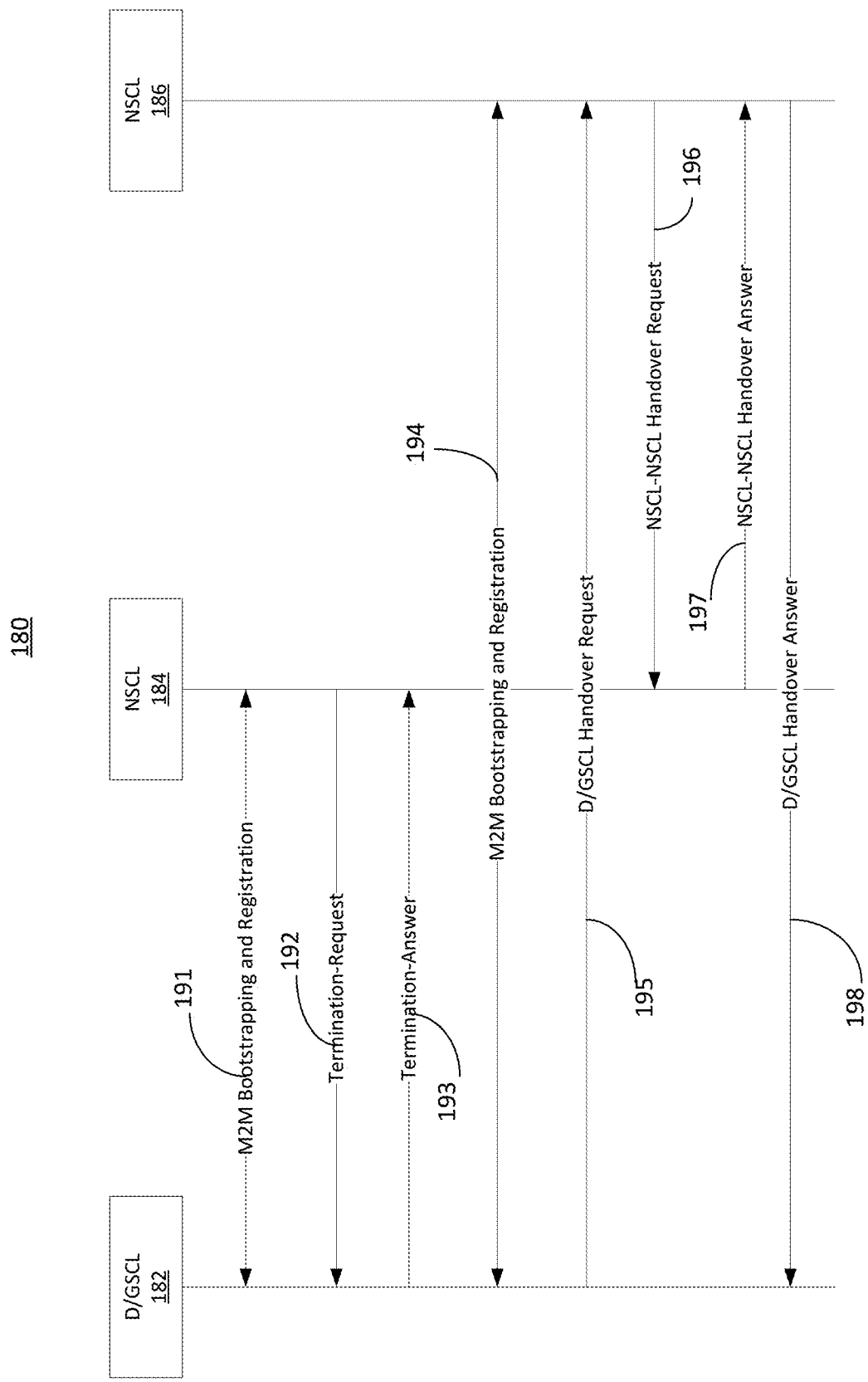
FIG. 4 illustrates service layer bootstrap erase and handover.

FIG. 4 illustrates a flow 180 for bootstrapping as discussed herein. In summary, in accordance with one embodiment of a novel bootstrapping process, NSCL 184 initiates a bootstrap erase and, as part of the process, recommends another NSCL (NSCL 186) to which D/GSCL 182 may subsequently register. Once D/GSCL 182 registers with the recommended NSCL 186, NSCL 184 and NSCL 186 execute a handover procedure. The handover procedure includes transferring the resources (i.e., data or information) regarding D/GSCL 182 that are stored on NSCL 184 to NSCL 186. For example, the D/GSCL may have stored resources about itself on NSCL 184. The stored resources may include details of what services can be provided by the D/GSCL, a history of sensor data that has been collected by the D/GSCL, where the D/GSCL is located, etc. When the D/GSCL moves its registration from NSCL 184 to NSCL 186, this information will be moved from NSCL 184 to NSCL 186.

At 191, D/GSCL 182 bootstraps and registers with NSCL 184. Afterword (e.g., based on a Bootstrap Erase Decision as shown in FIG. 3), at 192, NSCL 184 initiates a bootstrap erase procedure. In accordance with an embodiment of the novel process disclosed herein, the bootstrap erase procedure is initiated using a termination-request message. Generally, either the D/GSCL 182 or the NSCL 184 may initiate termination. In one embodiment, the termination-request message may be similar to a protocol for carrying authentication for network access (PANA)-termination-request as described, in RFC 5191. In accordance with this embodiment, the termination-request message may further include additional value pairs (or the like) containing one or more of a temporary identification (tempScIId) value, a handover token (handOverToken), or a list of one or more recommended NSCLs, as discussed herein.

For example, when a NSCL is accessed by a D/GSCL over the public Internet, there are times when the D/GSCL sends its D/GSCL identifier "in the clear" (e.g., without ciphering) when making an initial contact with the NSCL. A preferable approach would be for the NSCL and D/GSCL to use an identifier that is temporary during the initial bootstrapping. The temporary identifier may be changed to a permanent identifier after bootstrapping. It is preferable that the D/GSCL be provided with temporary identifiers before executing a bootstrap erase. These temporary identifiers may be used to hide the true identity of the D/GSCL when bootstrapping in the future with a particular NSCL that was previously (e.g., hours or days before) bootstrapped or another NSCL that was appropriately (e.g., securely) informed of the temporary ID. In one embodiment, the bootstrap erase procedure disclosed herein assigns temporary identifiers for the next bootstrapping event. This is illustrated in step 192 of FIG. 4.

As shown, at 192, D/GSCL 182 receives a temporary D/GSCL ID (tempScIId)—as part of the termination-request message—when NSCL 184 initiates the bootstrap erase procedure. Because tempScIId is sent before termination of the connection, tempScIId is preferably encrypted with an M2M root key, Kmr (or the like). The temporary D/GSCL ID may be used by the D/GSCL next time it attempts to bootstrap with an NSCL. The process may be designed so that other NSCLs (e.g., NSCL 186) and other service providers will not resolve the temporary D/GSCL ID to the service provider and/or NSCL (e.g., NSCL 184) who created the identifier. NSCL 184 (or a service provider) who created the identifier is able to resolve the identifier to a permanent D/GSCL Identifier.

As also mentioned above, in one embodiment, the termination-request message sent in step 192 may also include a handover token. Again, because the handover token is sent before termination of the connection, the handover token may be encrypted with Kmr (or the like). The D/GSCL 182 may use the handover token the next time it connects with an NSCL, such as NSCL 186, for example. NSCL 186 may use the token to prove to NSCL 184 that D/GSCL 182 is registered with the new NSCL (NSCL 186) and should be authorized to take ownership of the resources of D/GSCL 182. In an embodiment, the handover token may be provided in a "handOverToken" field of either the PANA-Termination-Request when the NSCL initiates the bootstrap erase procedure or in the PANA-Termination-Answer when the D/GSCL initiates the bootstrap erase procedure. The handover token is a unique key (a number, set of letters, alphanumeric, or the like) that the D/GSCL 182 can give to the new NSCL 186. The new NSCL 186 can then use the token to prove to the old NSCL 184 that the D/GSCL 182 has moved to NSCL 186. The token is an indication to NSCL 184 that it is safe to send any data that D/GSCL 182 previously stored on NSCL 184 to NSCL 186

Further in accordance with the present embodiment, the termination-request message sent in step 192 may include recommended NSCLs with whom the D/GSCL 182 may connect as part of a hand-over. The recommended NSCLs may be specified in the termination-request message in the form of a list of NSCL (or MSBF) identifiers that the current NSCL (i.e., NSCL 184) recommends the D/GSCL 182 attempt to bootstrap. The recommendation by NSCL 184 may be based on the services, among other things, used (or expected to be used) by D/GSCL 182.

Referring again to FIG. 4, at 193, D/GSCL 182 answers the request to perform the bootstrap erase procedure by sending a message to the NSCL requesting that the bootstrap erase procedure be initiated (e.g., termination request). In this case, the answer indicates if the D/GSCL accepted the bootstrap erase request. At 194, D/GSCL 182 selects NSCL 186 as the next NSCL with which it intends to bootstrap. This selection may be based on the list of recommended NSCLs provided in the termination-request message received in step 192. At 195, D/GSCL 182 sends a handover request message to NSCL 186. The handover request message requests that the resources stored on NSCL 184, which are related to D/GSCL 182, be transferred to NSCL 186. In one embodiment, this request may be sent with a SCL update request indication (sclUpdateRequestIndication) message. The sclUpdateRequestIndication message may provide the handover token (from the handOverToken field), as well as the identifier (e.g., NSCL-ID) of the old NSCL (e.g., NSCL 184) to NSCL 186.

Table 2 provides additional details regarding the primitives of the sclUpdateRequestIndication message, in accordance with one embodiment of the novel bootstrapping methods discussed herein. The optional fields in Table 2, for example, may be used to request that the NSCL 186 fetch the resource tree of D/GSCL 182 from the NSCL 184 with which D/GSCL 182 was previously registered. In an embodiment, the D/GSCL may issue an SCL create request (sclCreateRequestIndication) before using the sclUpdateRequestIndication to perform the handover operation. The sclCreateRequestIndication would happen right before step 195 in FIG. 4 (not shown). Step 195 in FIG. 4 is the sclUpdateRequestIndication. Rather than including the fields in Table 2 as part of the sclUpdateRequestIndication message, an alternative approach may include the fields in Table 2 in the sclCreateRequestIndication so that the D/GSCL registration and handover may be performed in a single step. The handover operation may not be done during the sclCreateRequestIndication during times when the sclCreateRequestIndication message may have been sent before the NSCL is authenticated by the D/GSCL. The handover information may not be provided in the sclCreateRequestIndication if the NSCL and D/GSCL have not authenticated each other

TABLE 2 sclUpdateRequestIndication

| | Description |
|---|---|
| Primitive Attribute | |
| requestingEntity | Application or SCL originally requesting the update of an SCL resource |
| targetID | The uniform resource identifier (URI) of the target entity where the SCL resource is updated. This request may address <sclBase>/scls/ of the target SCL |
| primitiveType | SCL_UPDATE_REQUEST |
| previousMsbf | The MSBF identifier (MSBF-ID) of the last MSBF that the D/GSCL was bootstrapped with. This field is used when requesting that information be handed over from an old NSCL or service provider to the new NSCL or service provider. |
| previousNscl | The SCL identifier (SCL-ID) of the last NSCL that the D/GSCL was registered with. This field is used when requesting that information be handed over from an old NSCL or service provider to the new NSCL or service provider. |
| previousSp | The service provider identifier (M2M-SP-ID) of the last NSCL that the D/GSCL was registered with. This field is used when requesting that information be handed over from an old NSCL or service provider to the new NSCL or service provider. |
| handOverToken | When bootstrapping with a new NSCL, this token may be used by the new NSCL to retrieve the D/GSCL's resources from the old NSCL. |
| Resource | |
| scl | The resource representation of the scl to be updated |

At 196, NSCL 186 sends a NSCL-NSCL handover request message to the NSCL 184, requesting the data related to D/GSCL 182 that were stored on NSCL 184. The NSCL-to-NSCL handover request message may include the handover token and the temporary D/GSCL 182 identifier. The handover token may be used to give a general authorization to access information from NSCL 184 and the temporary D/GSCL 182 identifier may particularly inform NSCL 184 which D/GSCL that NSCL 186 would like information about. In an embodiment, the NSCL-to-NSCL handover request message may be sent directly to the MSBF (not shown) that is associated with NSCL 184.

At 197, NSCL 184 responds to the NSCL-to-NSCL handover request message with the D/GSCL resources via a NSCL-to-NSCL handover answer message. At 198, NSCL 186 will respond to the sclUpdateRequestIndication with a SCL update response confirmation message (sclUpdateResponseConfirm).

Disclosed are methods regarding how certain events may be detected by the access network and used by the NSCL or like devices to initiate a bootstrap erase procedure. A bootstrap architecture is defined in a manner that allows the NSCL to manage bootstrap erase policies, detect access network specific events, initiate a bootstrap erase based on these policies and events, and allow for NSCL handover.

Figure 5A:
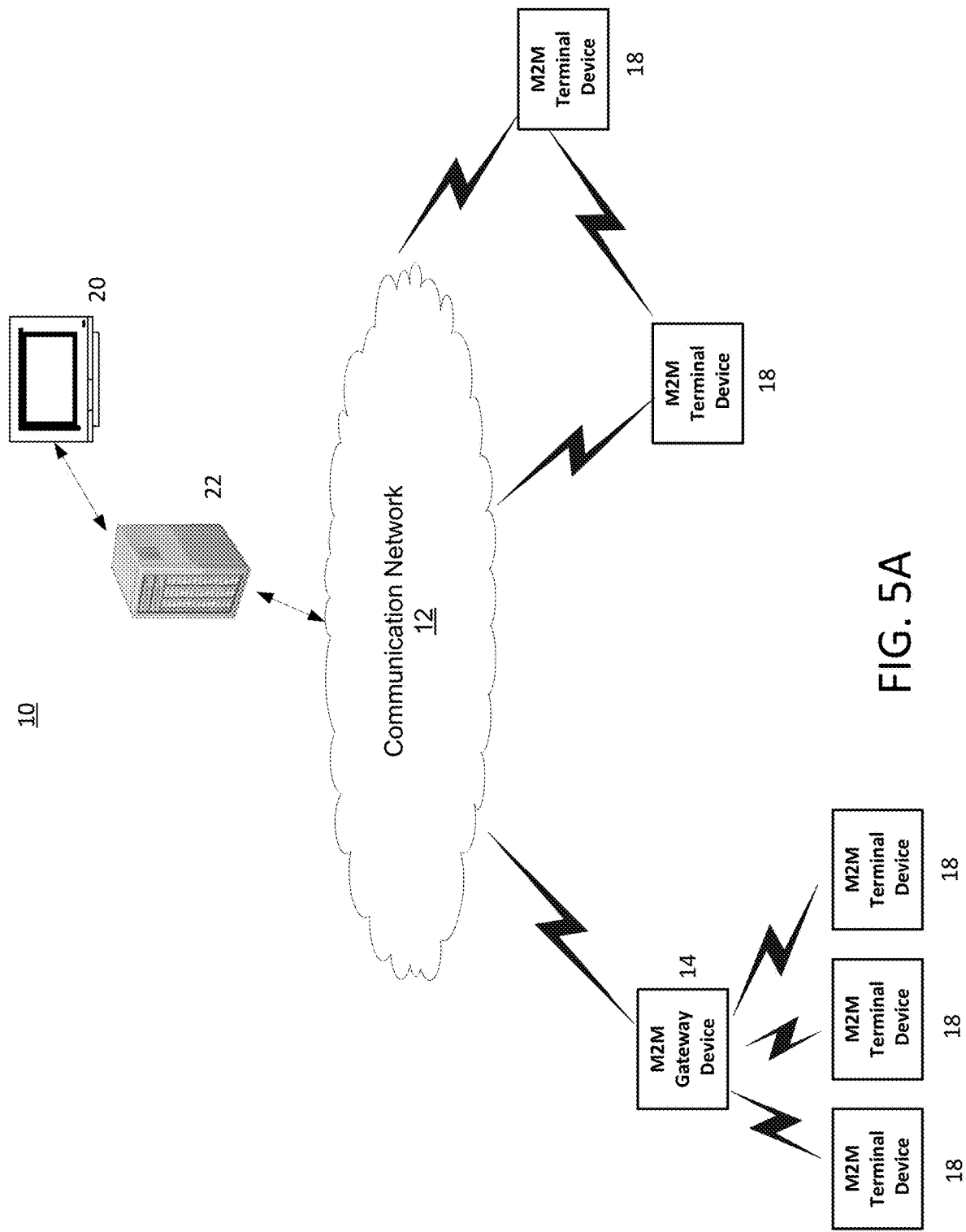
FIG. 5A is a system diagram of an example machine-to-machine (M2M) or Internet of Things (IoT) communication system in which one or more disclosed embodiments may be implemented.

FIG. 5A is a diagram of an example machine-to machine (M2M) or Internet of Things (IoT) communication system 10 in which one or more disclosed embodiments may be implemented. Generally, M2M technologies provide building blocks for the IoT, and any M2M device, gateway or service platform may be a component of the IoT as well as an IoT service layer, etc. With reference to FIG. 1 thru FIG. 4 above, the methods and architecture for bootstrapping disclosed herein may be implemented with the M2M server and one more M2M devices (e.g., M2M gateway device or M2M terminal device) shown in FIG. 5A through FIG. 5D. For example, M2M gateway device 14 or M2M terminal device 18 of FIG. 5B may function the same as D/GSCL 104 found in FIG. 1 and GSCL 241 or DSCL 245 in FIG. 2A. M2M service platform 22 of FIG. 5B may function the same as NSCL 112 found in FIG. 1 or NSCL 231 found in FIG. 2A.

As shown in FIG. 5A, the M2M/IoT communication system 10 includes a communication network 12. The communication network 12 may be a fixed network or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 5A, the M2M/IoT communication system 10 may include an M2M gateway device 14, and M2M terminal devices 18. It will be appreciated that any number of M2M gateway devices 14 and M2M terminal devices 18 may be included in the M2M/IoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g. PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service platform 22, as described below. M2M devices 18 and gateways 14 may communicate via various networks including, cellular, WLAN, WPAN (e.g., Zigbee, 6LoWPAN, Bluetooth), direct radio link, and wireline for example.

The illustrated M2M service platform 22 provides services for the M2M application 20, M2M gateway devices 14, M2M terminal devices 18 and the communication network 12. It will be understood that the M2M service platform 22 may communicate with any number of M2M applications, M2M gateway devices 14, M2M terminal devices 18 and communication networks 12 as desired. The M2M service platform 22 may be implemented by one or more servers, computers, or the like. The M2M service platform 22 provides services such as management and monitoring of M2M terminal devices 18 and M2M gateway devices 14. The M2M service platform 22 may also collect data and convert the data such that it is compatible with different types of M2M applications 20. The functions of the M2M service platform 22 may be implemented in a variety of ways, for example as a web server, in the cellular core network, in the cloud, etc.

Figure 5B:
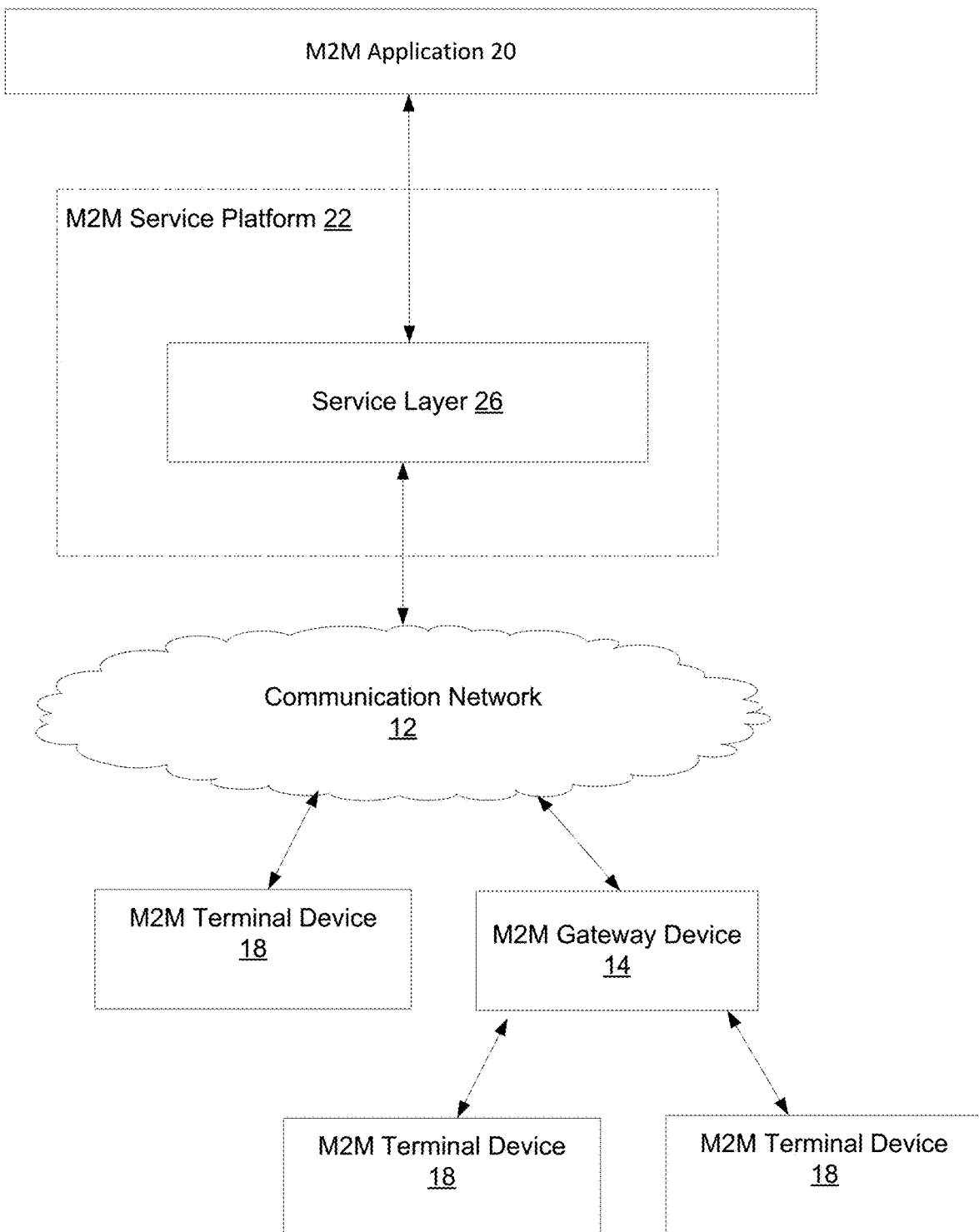
FIG. 5B is a system diagram of an example architecture that may be used within the M2M/IoT communications system illustrated in FIG. 5A.

Referring also to FIG. 5B, the M2M service platform typically implements a service layer 26 that provides a core set of service delivery capabilities that diverse applications and verticals can leverage. These service capabilities enable M2M applications 20 to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 26 also enables M2M applications 20 to communicate through various networks 12 in connection with the services that the service layer 26 provides.

The M2M applications 20 may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20.

Figure 5C:
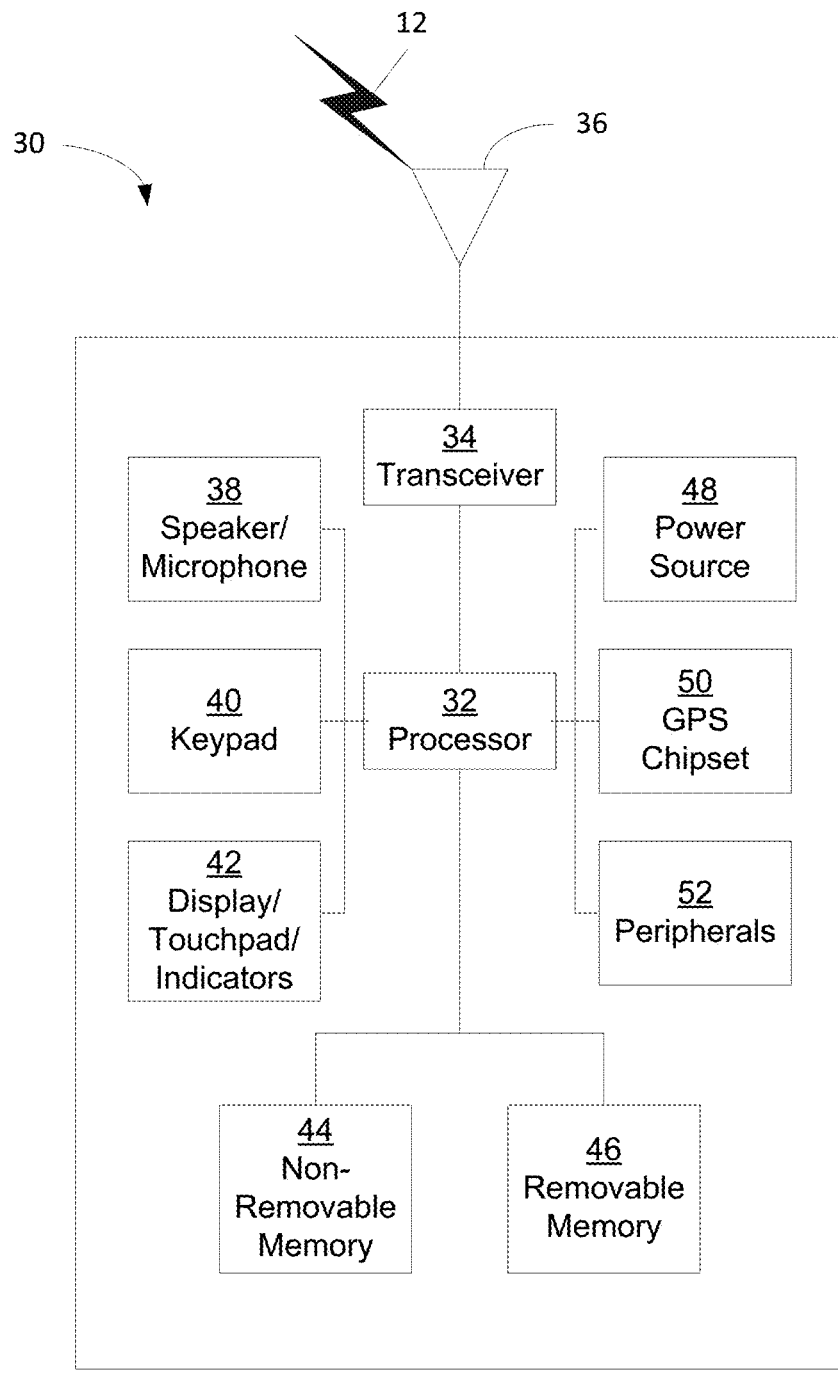
FIG. 5C is a system diagram of an example M2M/IoT terminal or gateway device that may be used within the communications system illustrated in FIG. 5A.

FIG. 5C is a system diagram of an example M2M device 30, such as an M2M terminal device 18 or an M2M gateway device 14 for example. As shown in FIG. 5C, the M2M device 30 may include a processor 32, a transceiver 34, a transmit/receive element 36, a speaker/microphone 38, a keypad 40, a display/touchpad/indicators 42, non-removable memory 44, removable memory 46, a power source 48, a global positioning system (GPS) chipset 50, and other peripherals 52. It will be appreciated that the M2M device 40 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 5C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 5C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer. The processor 32 may be configured to control lighting patterns, images, or colors on the display or indicators 42 in response to whether the NSCL-NSCL handover process in some of embodiments described herein is successful or unsuccessful, or otherwise shows information related to the NSCL-NSCL handover processes (e.g., the identity of newly registered NSCL).

The processor 30 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 5D:
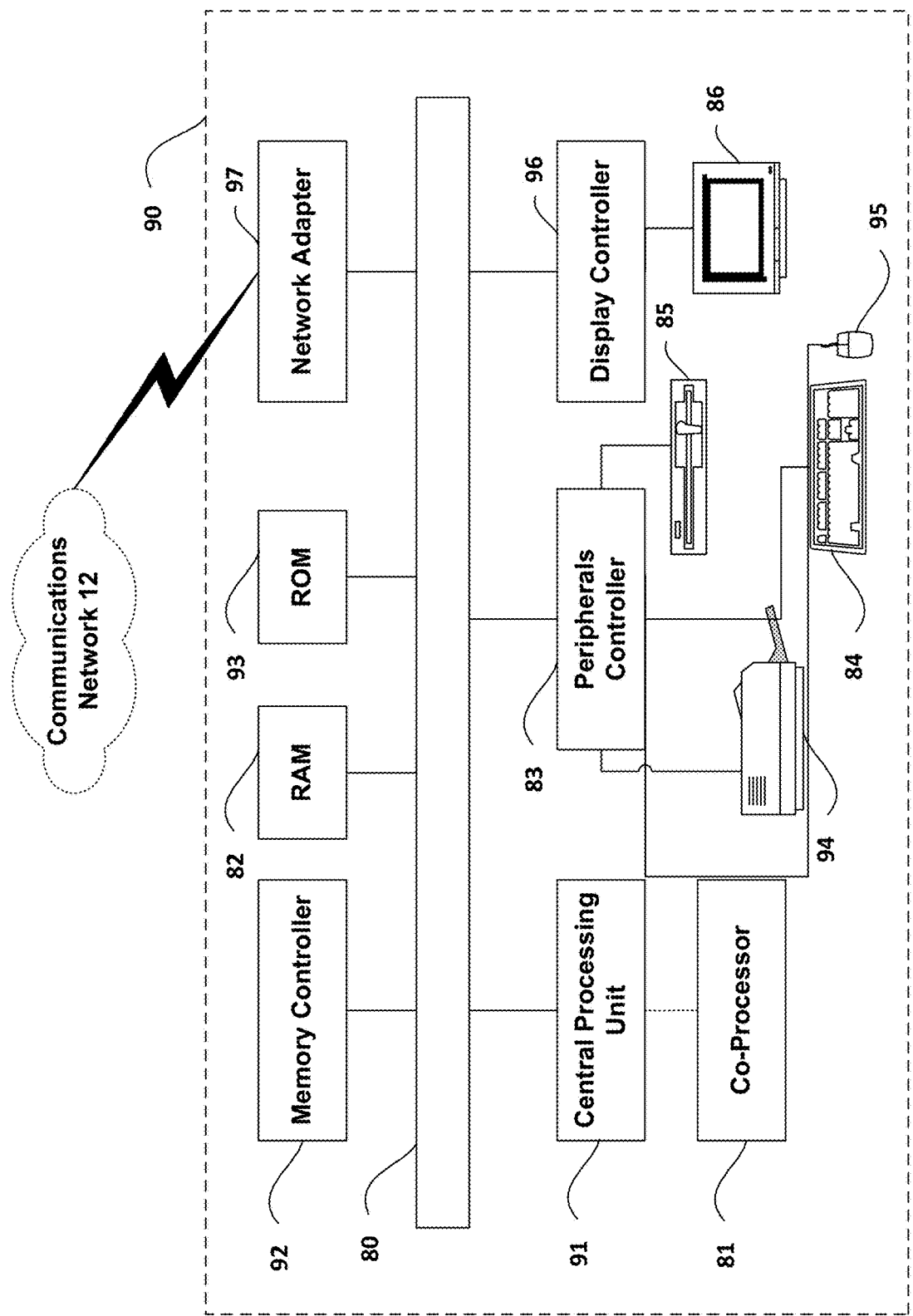
FIG. 5D is a block diagram of an example computing system in which aspects of the communication system of FIG. 5A may be embodied.

FIG. 5D is a block diagram of an exemplary computing system 90 on which, for example, the M2M service platform 22 of FIGS. 1A and 1B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 1A and 1B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A method for service capability handover, the method comprising:
   receiving a registration request for registering a device to a first service layer entity to create a service capability registration relationship between the device and the first service layer entity, the registration request comprising a handover token indicating that the first service layer entity is authorized to retrieve data associated with the device from a second service layer entity, wherein the device comprises operations for service capability handover associated with a service layer, the service layer functionally located between the located between a communication network layer and application layer; and
   fetching data associated with the device from the second service layer entity with information about a previous instance of service layer registration with the device.

2. The method of claim 1, wherein the first service layer entity and the second service layer entity are located between an application layer and a network layer.

3. The method of claim 1, wherein the device comprises a gateway service capability layer or a device service capability layer.

4. The method of claim 1, further comprising receiving, by the device, a temporary identifier to identify the device during initiation of service layer registration.

5. The method of claim 4, wherein the temporary identifier is received from the second service layer entity before the device is released from being bootstrapped with the second service layer entity.

6. The method of claim 5, wherein the temporary identifier is received from the second service layer entity before the device is deregistered from the second service layer entity.

7. The method of claim 1, further comprising transmitting the handover token to the second service layer entity, wherein the second service layer entity uses the handover token to allow the first service layer entity to fetch the data associated with the device.

8. A device for service capability handover, the device comprising:
   a processor; and
   a memory coupled with the processor, the memory comprising executable instructions that when executed by the processor cause the processor to effectuate operations comprising:
      transmitting a registration request for registering the device to a first service layer entity to create a service capability registration relationship between the device and the first service layer entity, the registration request comprising a handover token indicating that the first service layer entity is authorized to retrieve data associated with the device from a second service layer entity, wherein the first service layer entity is configured to fetch data associated with the device from the second service layer entity with information about a previous instance of service layer registration with the device, wherein the device comprises operations for service capability handover associated with a service layer, the service layer functionally located between the located between a communication network layer and application layer; and
      receiving a response to the registration request.

9. The device of claim 1, wherein the first service layer entity and the second service layer entity are located between an application layer and a network layer.

10. The device of claim 1, wherein the device comprises a gateway service capability layer or a device service capability layer.

11. The device of claim 1, the operations further comprising receiving a temporary identifier to identify the device during initiation of service layer registration.

12. The device of claim 1, wherein the temporary identifier is received from the second service layer entity before the device is released from being bootstrapped with the second service layer entity.

13. The device of claim 12, wherein the temporary identifier is received from the second service layer entity before the device is deregistered from the second service layer entity.

14. The device of claim 8, wherein the second service layer entity uses the handover token forwarded from the first service layer entity to allow the first service layer entity to fetch the data associated with the device.

15. A network apparatus for service capability handover, the apparatus comprising:
   a processor; and
   a memory coupled with the processor, the memory comprising executable instructions that when executed by the processor cause the processor to effectuate operations comprising:
      receiving a registration request for registering a device to a first service layer entity to create a service capability registration relationship between the device and the first service layer entity, the registration request comprising a handover token indicating that the first service layer entity is authorized to retrieve data associated with the device from a second service layer entity, wherein the device comprises operations for service capability handover associated with a service layer, the service layer functionally located between the located between a communication network layer and application layer; and
      fetching data associated with the device from the second service layer entity with information about a previous instance of service layer registration with the device.

16. The network apparatus of claim 15, wherein the first service layer entity and the second service layer entity are located between an application layer and a network layer.

17. The network apparatus of claim 15, the operations further comprising receiving a temporary identifier to identify the device during initiation of service layer registration.

18. The network apparatus of claim 17, wherein the temporary identifier is received from the second service layer entity before the device is released from being bootstrapped with the second service layer entity.

19. The network apparatus of claim 18, wherein the temporary identifier is received from the second service layer entity before the device is deregistered from the second service layer entity.

20. The network apparatus of claim 15, wherein the second service layer entity uses the handover token forwarded from the first service layer entity to allow the first service layer entity to fetch the data associated with the device.

* * * * *